(12) United States Patent
Manor (10) Patent No.: US 7,541,943 B2
(45) Date of Patent: Jun. 2, 2009

(54) TRAFFIC SENSOR INCORPORATING A VIDEO CAMERA AND METHOD OF OPERATING SAME

(75) Inventor: Dan Manor, Toronto (CA)

(73) Assignee: EIS Electronic Integrated Systems Inc., Toronto (CA)

( * ) Notice: Subject to any disclaimer, the term of this patent is extended or adjusted under 35 U.S.C. 154(b) by 441 days.

(21) Appl. No.: 11/418,061

(22) Filed: May 5, 2006

(65) Prior Publication Data

US 2007/0257819 A1    Nov. 8, 2007

(51) Int. Cl.
G08G 1/017    (2006.01)
(52) U.S. Cl. .................... 340/937; 340/933; 340/522
(58) Field of Classification Search ............... 340/937, 340/933–936, 522; 701/117–119; 342/450, 342/454
See application file for complete search history.

(56) References Cited

U.S. PATENT DOCUMENTS

| | | | |
|---|---|---|---|
| 4,866,438 A * | 9/1989 | Knisch .................. 340/936 |
| 4,887,080 A * | 12/1989 | Gross .................... 340/937 |
| 4,967,201 A | 10/1990 | Rich, III | |
| 4,977,406 A | 12/1990 | Tsukamoto et al. | |
| 5,161,107 A | 11/1992 | Mayeaux et al. | |
| 5,402,346 A | 3/1995 | Lion et al. | |
| 5,408,330 A * | 4/1995 | Squicciarini et al. ........ 386/107 |
| 5,423,080 A | 6/1995 | Perret et al. | |
| 5,621,645 A | 4/1997 | Brady | |
| 5,663,720 A | 9/1997 | Weissman | |
| 5,694,134 A | 12/1997 | Barnes | |
| 5,793,491 A | 8/1998 | Wangler et al. | |
| 5,798,983 A | 8/1998 | Kuhn et al. | |
| 5,878,367 A | 3/1999 | Lee et al. | |
| 5,884,212 A | 3/1999 | Lion | |
| 5,920,280 A | 7/1999 | Okada et al. | |
| 5,949,383 A | 9/1999 | Hayes et al. | |
| 6,114,973 A | 9/2000 | Winner et al. | |
| 6,411,328 B1 * | 6/2002 | Franke et al. ............... 348/149 |
| 6,466,862 B1 * | 10/2002 | DeKock et al. ............. 701/117 |
| 6,502,053 B1 * | 12/2002 | Hardin et al. .............. 702/143 |
| 6,556,916 B2 | 4/2003 | Waite et al. | |
| 6,577,269 B2 | 6/2003 | Woodington et al. | |
| 6,662,099 B2 * | 12/2003 | Knaian et al. .............. 701/117 |
| 6,693,557 B2 | 2/2004 | Arnold et al. | |
| 6,696,978 B2 * | 2/2004 | Trajkovic et al. ............ 340/936 |
| 6,750,787 B2 | 6/2004 | Hutchinson | |
| 6,917,308 B2 * | 7/2005 | Hilliard ...................... 340/940 |
| 7,150,430 B2 * | 12/2006 | Silansky et al. .............. 244/30 |

(Continued)

OTHER PUBLICATIONS

Beard et al., "6GHz Range Finder Using Pulse Compression", IGARSS 2000.

(Continued)

Primary Examiner—Eric M Blount
(74) Attorney, Agent, or Firm—Bereskin & Parr LLP (57) ABSTRACT

A traffic sensor and a method of operating the traffic sensor to collect vehicular traffic data for a road is described. The traffic sensor has (a) a radar module for generating radar-based vehicle data regarding a plurality of vehicles passing the sensor field of view based on detection and measurement of traffic; (b) an image module for generating image data representing a plurality of images of the road and the traffic; and, (c) a traffic sensor enclosure for enclosing both the radar module and the image module.

23 Claims, 11 Drawing Sheets

U.S. PATENT DOCUMENTS

| | | | | |
|---|---|---|---|---|
| 7,286,189 | B2* | 10/2007 | Sullivan | 348/565 |
| 7,359,796 | B2* | 4/2008 | Zhao et al. | 701/201 |
| 2002/0158922 | A1* | 10/2002 | Clark et al. | 345/864 |
| 2003/0080878 | A1* | 5/2003 | Kirmuss | 340/936 |
| 2006/0066472 | A1* | 3/2006 | Janssen | 340/905 |
| 2006/0167617 | A1* | 7/2006 | Krikelis | 701/117 |

OTHER PUBLICATIONS

Berka et al., "New Perspectives for ATMS: Advanced Technologies in Traffic Detection", Journal of Transportation Engineering, vol. 124, No. 1, pp. 9-15, Jan./Feb. 1998.

Dailey, "A Statistical Algorithm for Estimating Speed from Single Loop Volume and Occupancy Measurements", Transportation Research Board, Part B33, pp. 133-136, 1999, Elsevier Science Ltd.

Derneryd, "Linearly Polarized Microstrip Antennas", IEEE Transactions on Antennas and Propagation, pp. 846-851, Nov. 1976.

Gern et al., "Advanced Lane Recognition—Fusing Vision and Radar", Proceedings of the IEEE Intelligent Vehicles Symposium 2000, pp. 45-51, Oct. 3-5, 2000, MI, USA.

Gonzalez et al., "Lane Detection Using Histogram-Based Segmentation and Decision Trees", 2000 IEEE Intelligent Transportation Systems Conference Proceedings, pp. 346-351, Oct. 1-3, 2000, MI, USA.

Kim et al., "Two Novel Radar Vehicle Detectors for the Replacement of a Conventional Loop Detector", Microwave Journal, vol. 44, No. 7, pp. 22, 26-28, 32, 35, 38, 40, Jul. 2001, MA, USA.

Krämer, "Envisioning a Radar-Based Automatic Road Transportation System", Intelligent Transportation Systems, pp. 75-77, May/Jun. 2001.

Kranig et al., "Field Test of Monitoring of Urban Vehicle Operations Using Non-Intrusive Technologies"—Final Report, Publ'n No. FHWA-PL-97-018, Part IV—Department of Transportation Federal Highway Administration, May 1997, USA.

Lion, "Radar for Automatic Incident Detection and Traffic Analysis: The Beatrics Sensors", Proceedings of the First World Congress on Applications of Transport Telematics and Intelligent Vehicle-Highway Systems 1995 ERTICO, pp. 1285-1290, 1995.

Ma et al., "Road and Lane Edge Detection with Multisensor Fusion Methods", 0-7803-5467-2/99, 1999, IEEE.

Middleton et al., "Initial Evaluation of Selected Detectors to Replace Inductive Loops on Freeways", Technical Report No. 1439-7, Apr. 2000, Texas Transportation Institute, TX, USA.

SmarTek Acoustic Sensor—Version 1 (SAS-1), Installation and Setup Guide, Jul. 25, 2005, SmarTek Systems Inc., VA, USA.

Smith et al., "Development of a Low Cost, FM/CW Transmitter for Remote Sensing", Vehicle Detector Workshop, TexITE, Jun. 2000.

Stewart et al., "Adaptive Lane Finding In Road Traffic Image Analysis", Road Traffic Monitoring and Control, Apr. 26-28, 1994, Conference Publication No. 391, IEEE.

Unknown, "A Photo Showing the RTMS model XX3 from inside", Sep. 2003.

Unknown, "Applications of Above Ground Detectors", ASIM Technologies Ltd.—Traffic—Applications, May 2006, www.asim-technologies.com.

Unknown, "Detection Technology: for IVHS—vol. 1: Final Report Addendum" Publ'n No. FHWA-RD-96-100, Jul. 1995 (§ 12).

Unknown, "Non-Intusive Vendors", Evaluation of Non-Intrusive Technologies for Traffic Detection, May 2006, Minnesota Dept. of Transportation, http://projects.dot.state.mn.us.

Unknown, "On-Bench Photographs of Detectors", pp. 1-9, Jan. 16, 2002.

Unknown, "Robot Visual Systems—Global Expertise in Traffic Safety Solutions", Robot Visual Systems, May 2006, www.roadtraffic-technology.com.

Unknown, "RTMS Radar Traffic Detection—General Information", EIS Integrated Systems Inc., pp. 1-6, Jul. 21, 2001.

Unknown, "RTMS Traffic Detector Primer", EIS Electronic Integrated Systems Inc., pp. 1-4, Jul. 21, 2001.

Unknown, "RTMS User Manual Issue 3.2 by EIS, describing the automatic set up and lane configuration", pp. 9-13. Apr. 2004.

Unknown, "RTMS User Manual Issue 3.2 by EIS, describing the configuration of a traffic sensor currently in production by EIS—RTMS model X3", Apr. 2004.

Unknown, "Sensors", Transportation Operations Group, Vehicle Detection Workshop, Tex/TE pp. 1 of 13, 2 of 13, 11, 12, Jun. 2000.

Unknown, "SDR Fusion—Product Description", DataCollect Traffic Systems GmbH & Co.KG, May 2006, www.intertraffic.com.

Unknown, "Task Force L Final Report", Executive Summary, pp. 1-40, Jan. 16, 2002.

Unknown, "Video Recording Traffic Radar—Product Information", Olvia JSC, May 2006, www.intertraffic.com.

* cited by examiner

TRAFFIC SENSOR INCORPORATING A VIDEO CAMERA AND METHOD OF OPERATING SAME

FIELD OF THE INVENTION

The present invention relates in general to traffic sensors, and more specifically to the verification of the data provided by the sensor through the use of a video camera.

BACKGROUND OF THE INVENTION

As urban centers increase in size, and traffic congestion becomes more common, the need for accurate and up-to-date traffic information also increases. Traffic surveillance relies primarily on traffic sensors, such as inductive loop traffic sensors that are installed under the pavement. Alternatively, video sensors may also be used to obtain traffic information.

Residing underground, inductive loop sensors are expensive to install, replace and repair because of the associated roadwork required. Moreover, such roadwork also causes traffic disruptions. Video sensors, on the other hand, are cheaper, but have other drawbacks, such as an inability to operate in the dark or in weather that impairs visibility, such as fog or snow.

To overcome these drawbacks, radar sensors have been employed to obtain traffic information. Radar sensors typically transmit low-power microwave signals at the traffic, and detect vehicles based on the reflected signals. Radar sensors are generally cheaper than inductive loop traffic sensors, and, unlike video sensors, operate well in the dark and in a wide range of weather conditions.

SUMMARY OF THE INVENTION

In accordance with an aspect of the invention, there is provided a method of operating a traffic sensor to collect vehicular traffic data for a road. The traffic sensor has a radar module and an image module both contained in a traffic sensor enclosure. The method comprises a) operating the radar module to generate radar-based vehicle data regarding a plurality of vehicles passing a sensor field of view based on detection and measurement of the traffic on the road; b) operating the image module to generate image data representing a plurality of images of the road and the traffic on the road; and c) comparing the radar-based vehicle data with the image data.

In accordance with a second aspect of the invention, there is provided a traffic sensor for collecting vehicular traffic data for a road. The traffic sensor comprises: (a) a radar module for generating radar-based vehicle data regarding a plurality of vehicles passing the sensor field of view based on detection and measurement of traffic; (b) an image module for generating image data representing a plurality of images of the road and the traffic; and, (c) a traffic sensor enclosure for enclosing both the radar module and the image module.

BRIEF DESCRIPTION OF THE DRAWINGS

A detailed description of the preferred embodiments is provided herein below with reference to the following drawings, in which.

DETAILED DESCRIPTION OF EMBODIMENTS OF THE INVENTION

Figure 1:
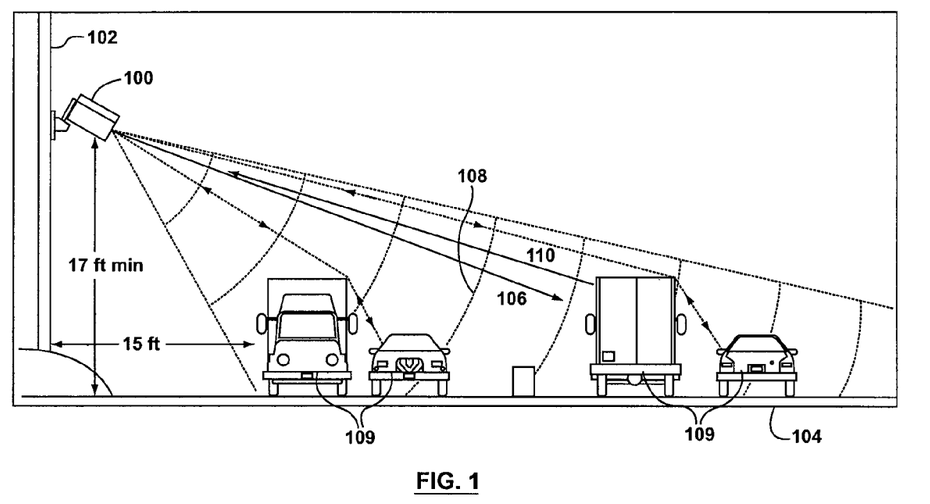
FIG. 1, in a schematic view, illustrates a traffic monitoring system in accordance with an aspect of the present invention.

Referring to FIG. 1, there is illustrated in a schematic view, a sensor 100 in accordance with a preferred aspect of the present invention. The sensor 100 is mounted on a pole 102 in a side-mounted configuration relative to road 104. Sensor 100 transmits a signal 106 through a field of view 108 at the road 104 to "paint" a long elliptical footprint on the road 104. Any non-background targets, such as vehicles 109, reflect a reflected signal Pr 110 having power level P. Specifically, the low-power microwave signal 106 transmitted by sensor 100 has a constantly varying frequency. Based on the frequency of the reflected signal 110, the sensor can determine when the original signal was transmitted, thereby determining the time elapsed and the range to the reflecting object. The range of this reflected object is the "r" in Pr.

Figure 2:
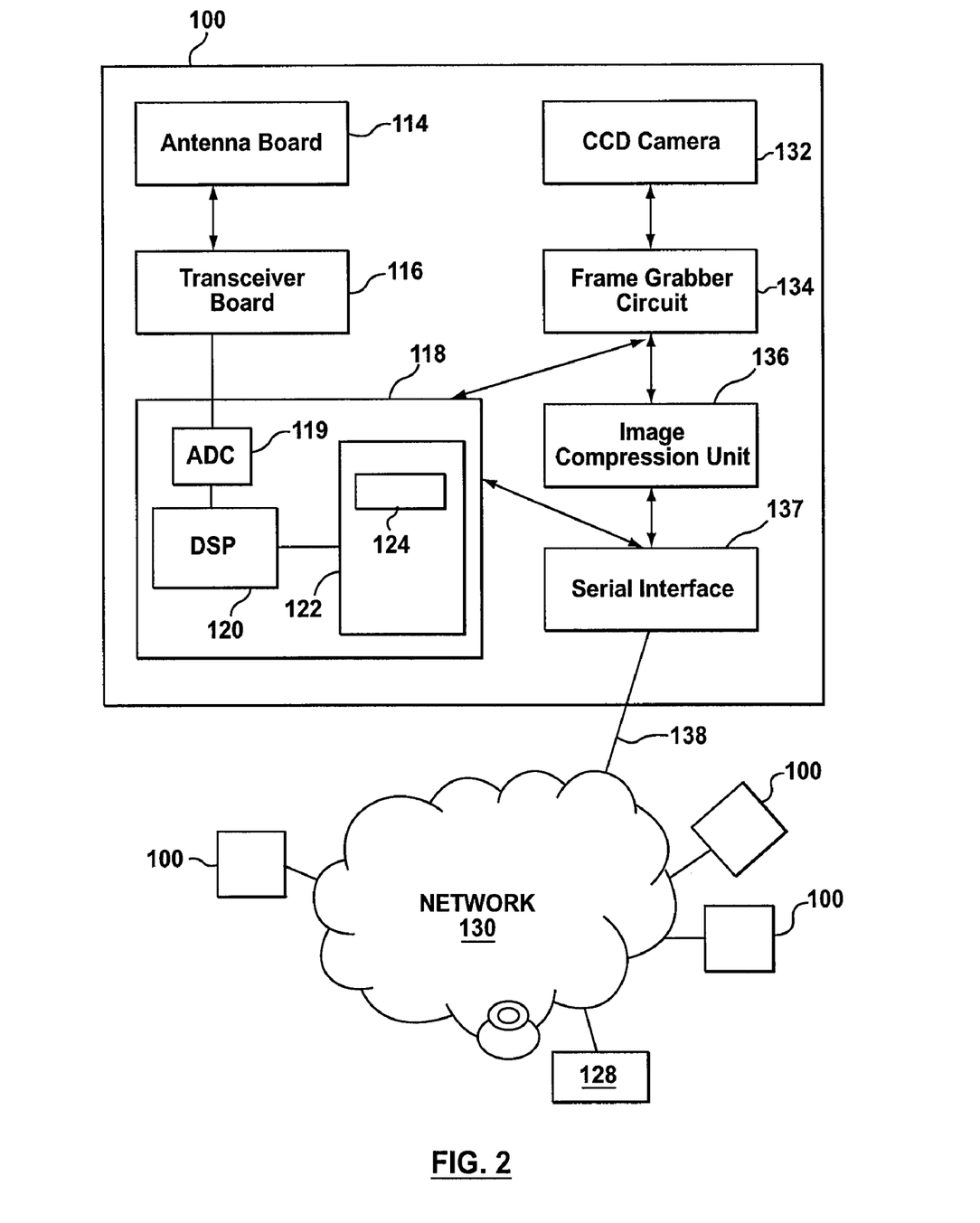
FIG. 2, in a block diagram, illustrates the traffic sensor of FIG. 1.

Referring to FIG. 2, the components of the sensor 100 are illustrated in a block diagram. As shown, the sensor 100 comprises an antenna board 114 for transmitting the signal 106 through field of view 108, and for receiving the reflected signal 110 back from the road. A transceiver board 116 is in electronic communication with, and drives, antenna board 114. Transceiver board 116 also receives the reflected signals from the antenna board 114, and transmits this information to a processor module 118. In some embodiments, processor module 118 comprises an Analog to Digital Converter (ADC) 119, a digital signal processor (DSP) chip 120 and a separate microcomputer chip 122. This microcomputer chip 122 in turn comprises an internal, non-volatile memory 124. In operation, the ADC 119 digitizes the reflected signal at specific sample times, while the DSP chip 120, which is a high-speed chip, does the raw signal processing of the digitized electrical signals received from the transceiver board 116. That is, the DSP chip 120 can determine if a vehicle is present by determining if the stream of electrical signals received from the transceiver board 116 meets a vehicle detection criterion. The DSP chip 120 can also determine the range of the vehicle from the sensor. This information is then sent to the microcomputer chip 122, which configures this data for transmission to external traffic management system 128 via network 130. Microcomputer chip 122 may also collate aggregate traffic density information from this data. Optionally, the processor module 118 includes but a single DSP processor in addition to ADC 119, which single DSP processor handles the interface with external traffic management system 128 via network 130 in addition to the other tasks performed by DSP chip 120. In either case, processor module 118 will be connected to network 130 through serial interface 137 via a communication link 138. Serial interface 137 provides a means of connecting sensor 100 to network 130. Typically, sensor 100 will be just one of many sensors as illustrated in FIG. 2, which are connected to external traffic management system 128 via network 130.

Sensor 100 additionally comprises a charge-coupled device (CCD) camera 132 for capturing video images of the road and vehicles monitored by sensor 100. Camera 132 can be a black and white or a color camera. In addition, it can be configured to have a sight field of view that overlaps the sensor field of view 108. Camera 132 is in electrical communication with a frame grabber circuit 134. Camera 132 can receive waves reflected from the road and convert them to electrical signals that are transmitted to the frame grabber circuit 134. Frame grabber circuit 134 is in electrical communication with image compression unit 136. Frame grabber circuit 134 can digitize the signal received from camera 132 and transmit the digitized signal to image compression unit 136. Processor 118 is also in electrical communication with frame grabber circuit 134 and can provide instructions to circuit 134 as to what frame rate to use during the digitization process. Image compression unit 136 comprises hardware and software that compresses the digitized signals provided by frame grabber circuit 136. Image compression unit 136 may utilize image compression formats such as MPEG 2 or MPEG 4. Serial interface 137 is in electrical communication with image compression unit 136 and processor module 118. As mentioned above, serial interface 137 provides a means for connecting sensor 100 to network 130. Serial interface can, for example, be a TCP/IP interface. The use of a TCP/IP interface allows for transmission to occur over the Internet or an Ethernet-based private network. Regardless of the particular protocol it utilizes, serial interface 137 may additionally comprise multiplexer 139 (shown in FIG. 3C). The use of multiplexer 139 allows for the transmission of the radar and image data over a single channel.

Figure 3A:
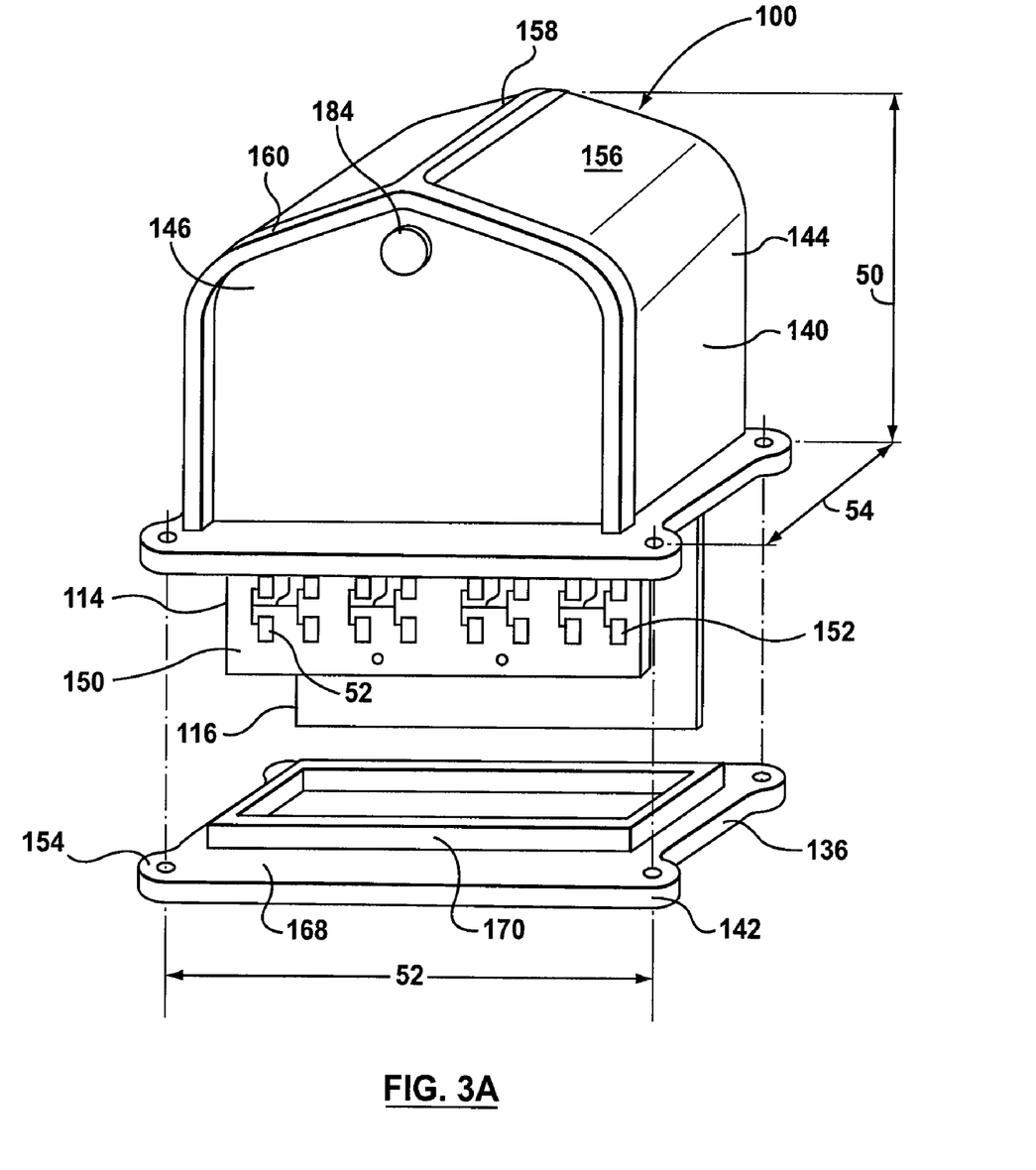
FIGS. 3A and 3B show an exploded front perspective view and rear perspective view, respectively, of the traffic sensor of FIG. 1.
Figure 3B:
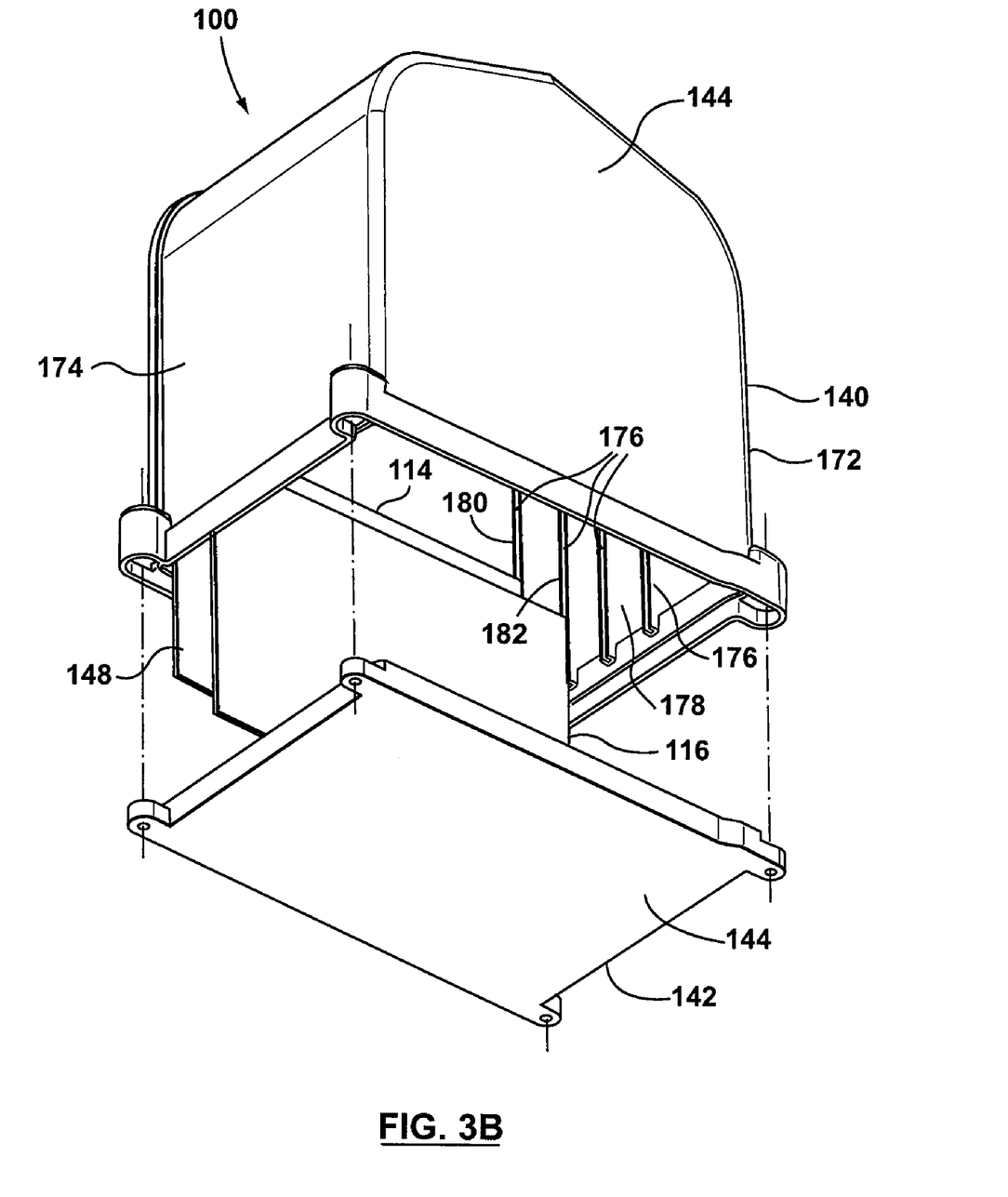

FIGS. 3A and 3B show an exploded front perspective view and rear perspective view, respectively, of the sensor 100. The sensor 100 includes a first component 140 and a second component 142 that mate to form a housing 144 having a front surface 146. The antenna board 114 and transceiver board 116 are both disposed within the housing 144, as is an extension card 186 shown in FIG. 3C.

The antenna board 114 has an antenna ground surface 148 (shown in FIG. 3B) and a radiating surface 150 (shown in FIG. 3A) with antenna elements 152 thereon. The antenna elements 152 may be etched on the radiating surface 150, for example. The front surface 146 of the housing 144 is substantially planar and substantially parallel to the radiating surface 150 of the antenna board 114.

Figure 4A:
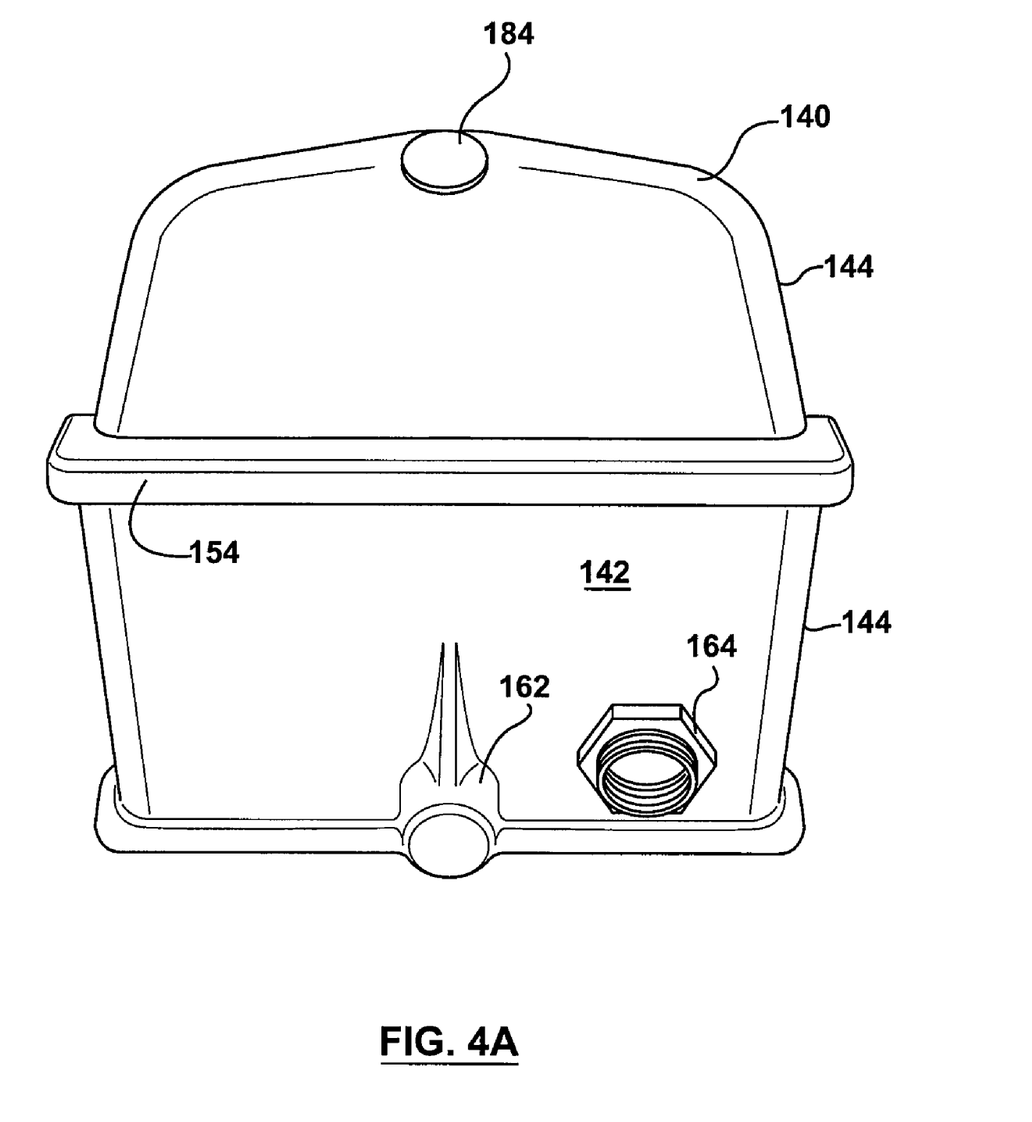
FIG. 4A is a bottom perspective view of a housing of the sensor of FIGS. 3A and 3B showing a first component and a second component of the housing.
Figure 4B:
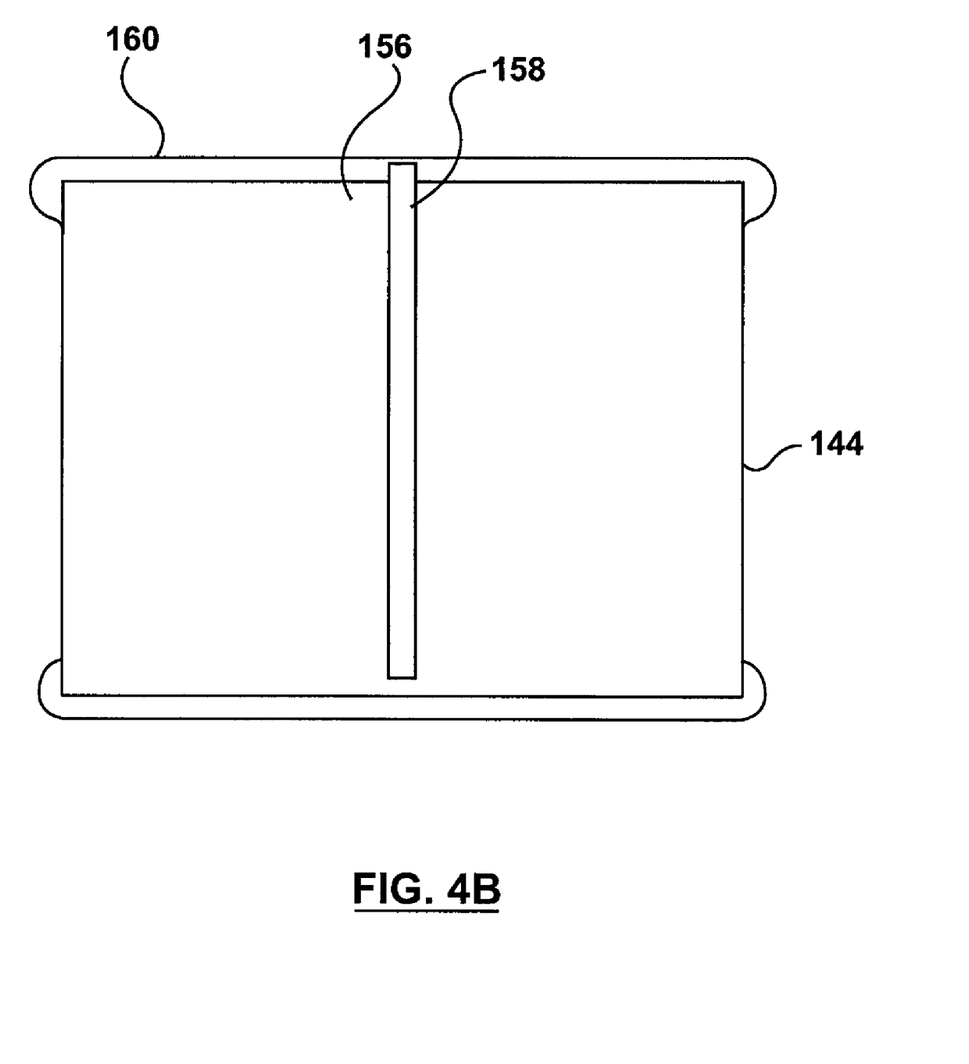
FIG. 4B is a top view of the housing of FIG. 4A.
Figure 4C:
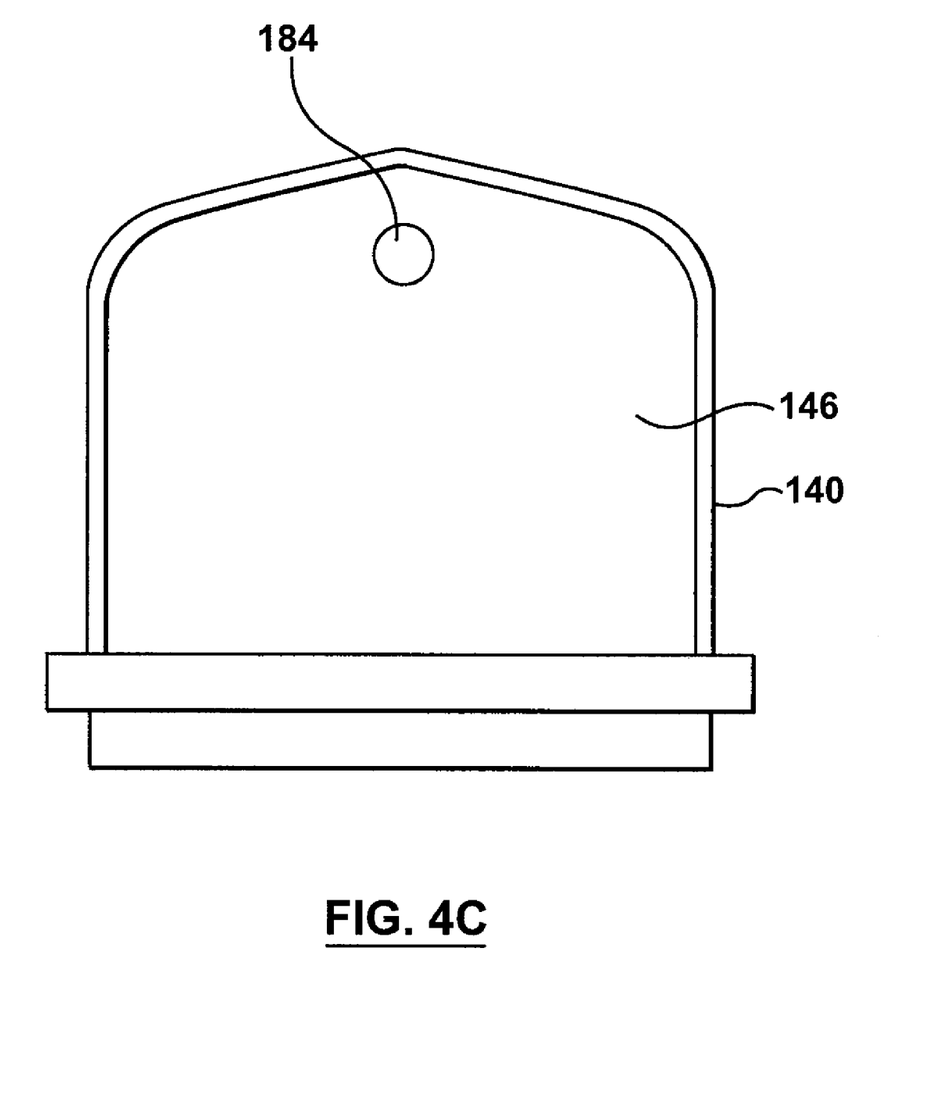
FIG. 4C is a front perspective view of the housing of FIG. 4A.

FIGS. 4A-4C show various views of the housing 144 of the sensor 100 of FIG. 1. In particular, FIG. 4A is a bottom perspective view of the housing 144 showing the first component 140 and the second component 142 thereof. FIG. 4B is a top view of the housing 144. FIG. 4C is a front perspective view of the housing 144 with the second component 142 removed.

As described above, the front surface 146 is substantially flat, without any ledges on which ice could accumulate. The housing 144 is substantially box-shaped with a height dimension 50, a width dimension 52, and a depth dimension 54 shown in FIG. 3A. The height dimension 50 and the width dimension 52 are orthogonal to each other and substantially parallel to the radiating surface 150 of the antenna board 114.

The depth dimension 54 is substantially orthogonal to the radiating surface 150 of the antenna board 114. In one embodiment, the height dimension 50 is less than twice the depth dimension 54 and the width dimension 52 is less than twice the depth dimension 54. In yet another embodiment, the height dimension 50 is less than 50% greater than the depth dimension 54, and the width dimension 52 is less than 50% greater than the depth dimension 54.

The first component 140 and the second component 142 of the housing 144 are attached together at a seal plane 154 (shown in FIGS. 3A and 4A), where the seal plane 154 is substantially perpendicular to the radiating surface 150 (shown in FIG. 3A). At least one of the first component 140 and the second component 142 may be composed of polycarbonate. The first component 140 can be attached to the second component 142 with any suitable affixing means, such as screws.

The first component 140 has a top portion 156 (shown in FIGS. 3A and 4B) that slopes downwards on either side of a center ridge 158 to permit rain to drain off the housing 144. In addition, the top portion 156 has a rain deflector 160 near the front surface 146 to direct rainwater away from the front surface 146.

The second component 142 has a support protrusion 162 (shown in FIG. 4A) that may be inserted into a mounting bracket attached to the pole 102 to support the sensor 100. The second component 142 also has a multi-pin connector 164 to attach appropriate cables (not shown) to power the sensor 100 and to allow communication between the sensor 100 and the outside world via the communication link 138. For example, the sensor 100 can communicate with the external traffic management system 128, which also communicates with other sensors.

Referring back to FIG. 3A, seal plane 154 is defined by a seal surface 168 of the second component 142. However, seal surface 168 is not the only surface that impedes moisture from leaking into the housing 144. That is, the second component 142 also includes an inner wall defining a second sealing surface 170. Both the first sealing surface 168 and the second sealing surface 170 of the second component 142 are aligned with corresponding sealing surfaces in the first component 140 when these components are attached together, such that both the first sealing surface 168 and the second sealing surface 170 provide a seal. By this means, the second sealing surface provides additional protection against water penetration, even if some leakage occurs along the first sealing surface.

As shown in FIG. 3B, the housing 144 has a first side face 172 and a second side face 174 substantially parallel to the first side face 172. A first set of slots 176 are provided on an inside surface 178 of the first side face 172, while a second set of slots (not shown) are provided on an inside surface of the second side face 174. Each slot in the first set of slots 176 is disposed opposite a corresponding slot in the second set of slots. The antenna board 114 engages with a first slot 180 in the first set of slots 176 and a corresponding slot in the second set of slots. The transceiver board 116 is inserted into the second slot 182. In FIG. 3B, only two boards—the antenna board 114 and the transceiver board 116, are shown as inserted into the first component 140 of the housing 144. However, as shown in FIG. 3B, the first set of slots 176 and the second set of slots include additional aligned pairs of slots for receiving additional boards.

The front surface 146 includes a window 184, located toward the top of the surface, through which camera 132 can observe the road. Camera 132 and window 184 can be arranged so as to allow camera 132 to have a sight field of view that overlaps the area radiated by antenna board 114. Camera 132 is preferably of a small size such that it fits into the top portion of housing 144. Both camera 132 and frame grabber circuit 134 are preferably installed in the top portion of housing 144. Image compression unit 136 and serial interface 137 are preferably located on the extension card 186 (illustrated in FIG. 3C) that plugs into one of the plurality of slots 176.

Figure 3C:
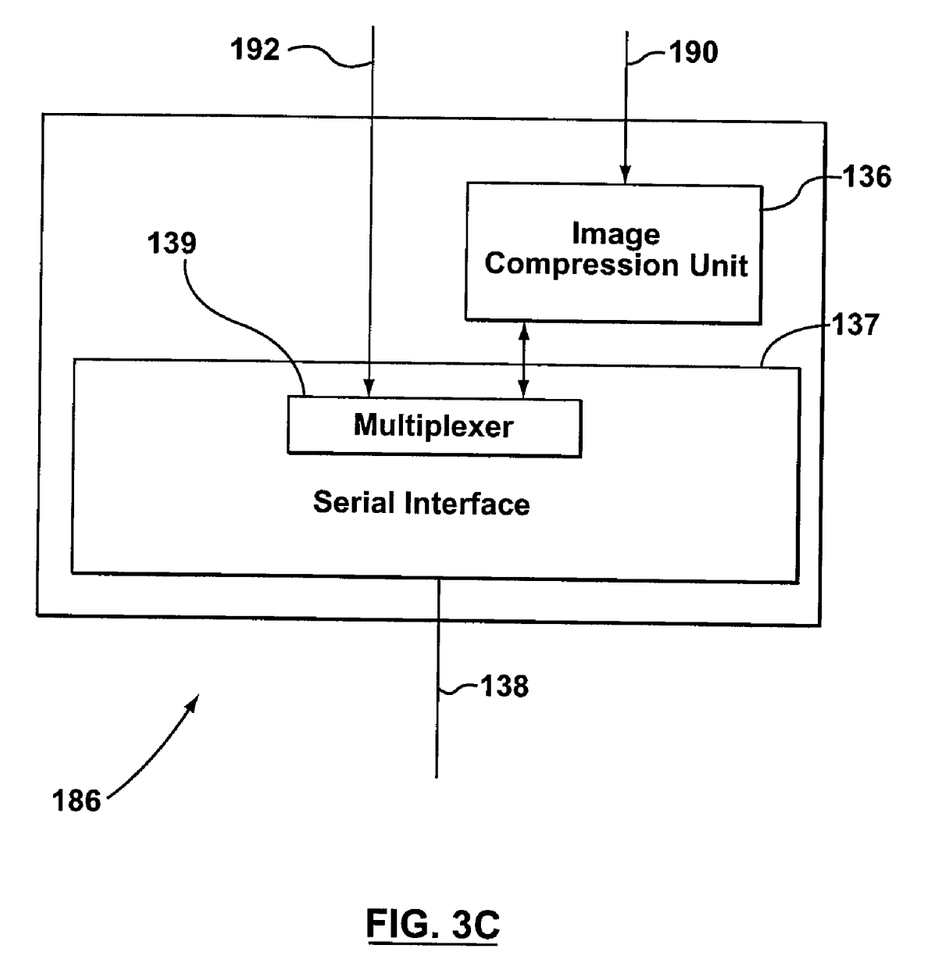
FIG. 3C, in a block diagram, illustrates an extension card for insertion into the traffic sensor of FIGS. 3A and 3B.

As shown in a block diagram in FIG. 3C, in some embodiments the serial interface 137 on the extension card 186 comprises a multiplexer 139. As mentioned above, this allows serial interface 137 to combine the signals received from compression unit 136 and processor 118 and to transmit them over a single channel. Link 190 provides a means of electrical communication between compression unit 136 and frame grabber circuit 134. Similarly, link 192 provides a means of electrical communication between serial interface 137 and processor 118.

Of course, it will be appreciated by those of skill in the art, that when extension card 186, the antenna board 114, the transceiver board 116 and any other card are inserted, the antenna board 114 should, in some embodiments, be the closest board to the front surface 146 of the housing 144, such that the radiation from the radiating surface 150 is unobstructed. Alternatively, the boards may be configured in other ways to reduce any obstruction of the radiation from the radiating surface 150.

The transceiver board 116 electrically drives the antenna board 114 at the appropriate frequency to produce radiation aimed at one or more traffic lanes. The radiation transmitted by the antenna board 114 is reflected back from the vehicle and is received by the antenna board 114, which sends corresponding electrical signals to the transceiver board 116. In turn, the transceiver board 116 sends corresponding signals to the processor module 118.

As described above in connection with FIG. 2, the processor module 118 includes hardware and software for processing the electrical signals from the transceiver board 116 to obtain vehicular traffic data. In particular, the processor module 118 determines if a vehicle is present by determining if the electrical signals received from the transceiver board 116 meet vehicle detection criteria. The processor module 118 also determines the range of the vehicle from the sensor 100, as well as automatically determining traffic lane centers. Moreover, the processor module 118 can monitor the characteristics of the radiation transmitted by the antenna board 114, and correct any perturbations therein that can arise because of temperature influences on the sensor 100, for example. This may be done, for example, by using the calibration methods disclosed in U.S. Pat. Nos. 6,556,916 and 5,798,983 and in U.S. patent application Ser. No. 11/182,817 filed by the applicant on Jul. 18, 2005, the contents of which are hereby incorporated by reference.

Despite the ability of sensor 100 to automatically calibrate itself by determining lane centers, independent verification that the sensor is properly calibrated is also desirable. For example, each detection zone should be centered on a lane of traffic. Data from camera 132 can be used to verify that each detection zone is centered on a valid lane of traffic. Alternatively, data from camera 132 may also be used to verify that a particular event, such as an accident, has occurred. Including camera 132 in the sensor 100 reduces the need for a technician or other person to physically attend at the site covered by sensor 100 to verify that the sensor 100 is operating properly, and/or that an accident has actually occurred.

There are a number of ways in which the verification process may occur. For example, it is possible for a person to physically attend at the location where the detection zones are located. This person could then independently count the traffic moving through each lane over a given period of time and ensure that this count is consistent with the data provided by the sensor. As stated above, this is inefficient in terms of both time and money.

Figure 5:
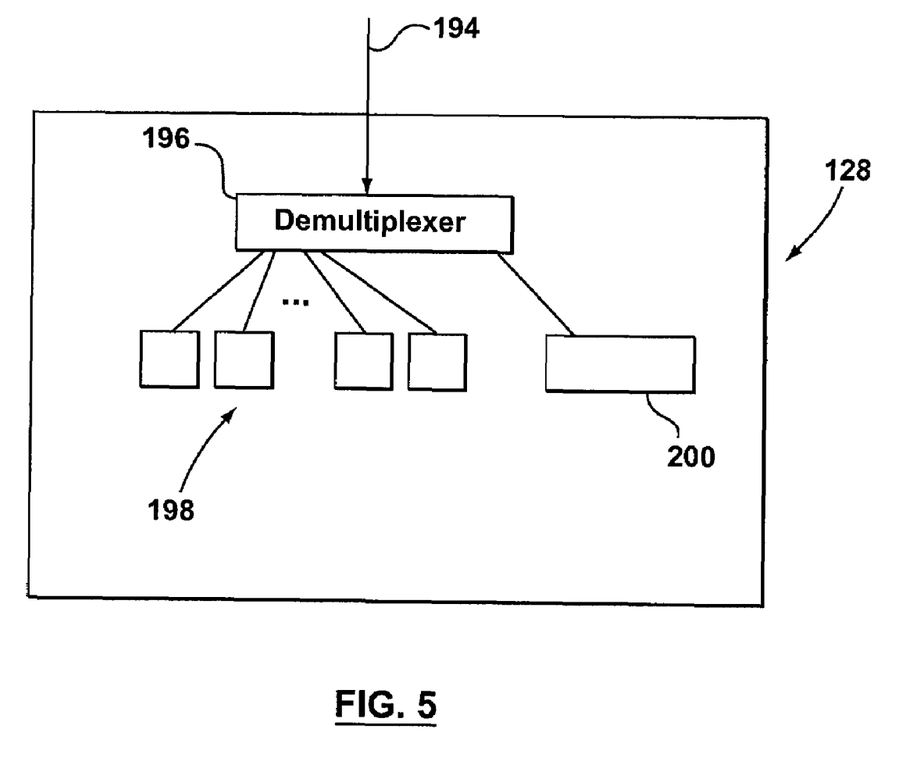
FIG. 5, in a block diagram, illustrates the external traffic management system of FIG. 1.

Alternatively, the calibration and verification can be done remotely. The images of the road as well as the data provided by the sensor can be transmitted to the external traffic management system 128. FIG. 5, in a block diagram, illustrates external traffic management system 128. As shown in the figure, external traffic management system 128 comprises a communication link 194, a demultiplexer 196, a plurality of screens 198, and a control means 200 for calibrating video sensors 100. Communication link 194 provides a means of electrical communication between external traffic management system 128 and network 130. Demultiplexer 196 separates the signal received through link 194 into image and radar data. The plurality of screens 198 is in electrical communication with demultiplexer 196 and are used to display video images and corresponding radar data. The image and radar data can be displayed on adjacent screens or on a single screen. Thus, in some embodiments, external traffic management system 128 can comprise a single screen. After the two sets of images are displayed they are compared to determine whether there are any discrepancies. If there are any discrepancies that indicate improper calibration, then control means 200 is used to recalibrate sensor 100. Of course, in some embodiments in which the images and data are provided to the external traffic management system 128 via separate feeds, the separation step and demultiplexer 196 are not required.

The use of camera 132 is not limited to calibrating the sensor. There may be other triggering events that result in a need to verify the data provided by the sensor 100. An example of such a triggering event may be an accident on the road. Should such an event occur, the appropriate sensor 100 can provide the traffic management system 128 with video images of the road and traffic. It should be understood that a triggering event need not be precipitated by an actual incident on the road. A simple request by the external traffic management system 128 to visually monitor the road for any number of reasons could itself constitute a triggering event.

In either case, it will be appreciated by a person skilled in the art, that video images need not be continuously transmitted during the operation of sensor 100. Video images need only be provided during calibration and verification of triggering events. Moreover, in the case of verification of triggering events it will often suffice to only provide a single still image of the road. Operating the sensor in this manner allows for a reduction in the amount of bandwidth that is required.

Figure 6:
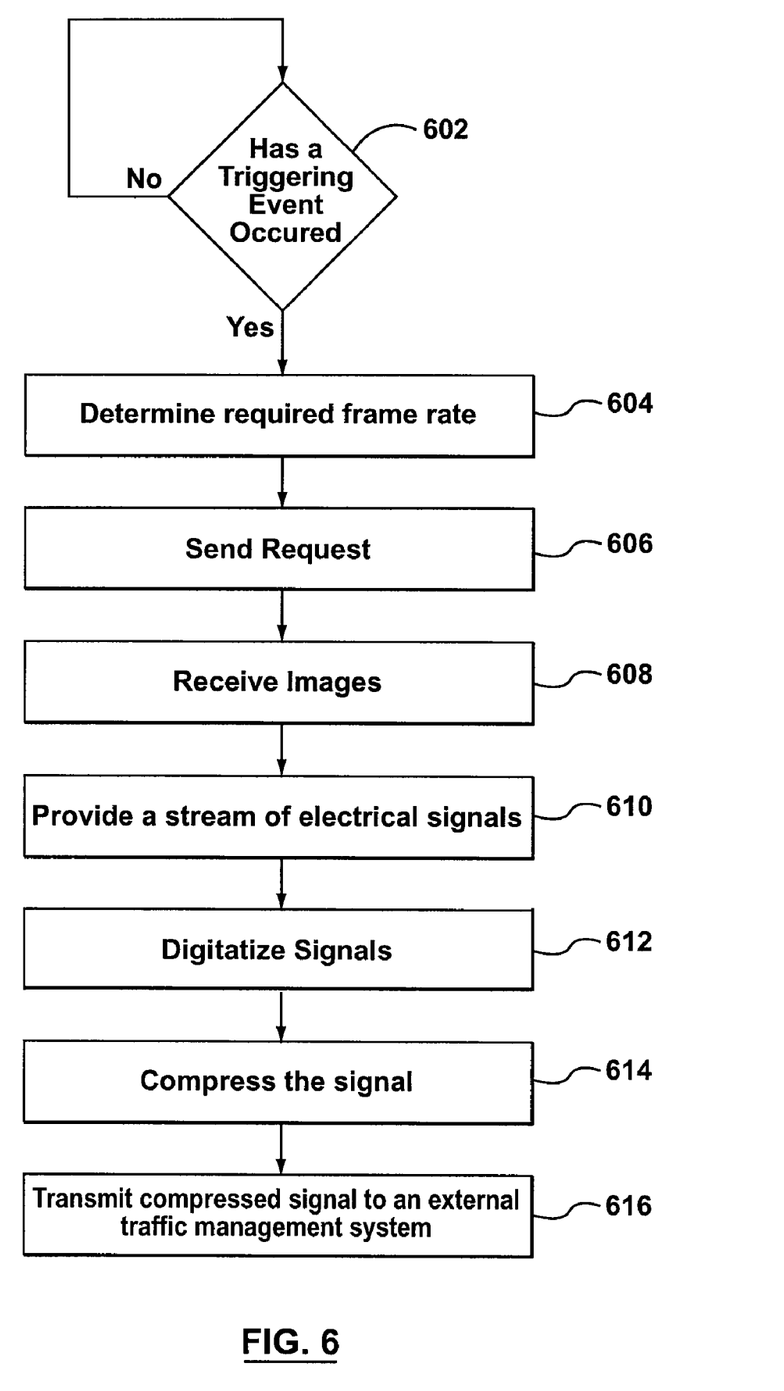
FIG. 6, in a flowchart, illustrates a method in accordance with an aspect of an embodiment of the invention by which the traffic sensor transmits image data to external traffic management system.

Reference is now made to FIG. 6, wherein there is illustrated, in a flowchart, a method by which a triggering event causes a video image to be transmitted from sensor 100 to external traffic management system 128 in accordance with an aspect of an embodiment of an invention. At step 602, processor 118 determines if a triggering event has occurred. In some embodiments, memory 124 stores a plurality of trigger criteria. Processor 118 continually monitors the radar-based vehicle data to determine if an event has occurred that satisfies any of the plurality of trigger criteria stored in memory 124. Processor 118 also monitors signals received from external traffic management system 128 to pick up any signals indicating a triggering event.

Processor 118 continually monitors the radar-based vehicle data using triggering algorithms. Examples of such algorithms would include the measurement of parameters indicating congestion, which congestion may indicate the presence of an accident. Three parameters indicative of congestion are: (1) the average speed over a number of lanes remaining lower then a predetermined threshold for predefined minimum period of time; (2) lane occupancy being higher then a predetermined threshold for a predefined minimum period of time; and, (3) a large difference between speeds or occupancy of one lane compared to an adjacent lane moving in the same direction. These triggering algorithms are called internal triggering algorithms as they use only the data that is provided to the processor 118 within a particular sensor 100. In contrast, external triggering algorithms may use data from multiple sensors 100, and are typically implemented outside of a particular sensor. For example, such external triggering algorithms could be implemented using a processor within external traffic management system 128.

At step 604, processor 118 determines what frame rate is required. The frame rate is the number of images that are captured and transmitted by camera 132 per second. The actual frame rate used could be anything in a wide range of possible frame rates. At one extreme, a single image may be captured. At the other extreme, the frame rate could be large enough to replicate full motion. In general, a higher frame rate results in the perception of smoother motion. As an example, many professional films use 24 frames per second to replicate motion. In some cases and in some embodiments, the frame rate selected will also depend on the available bandwidth for transmitting the image data to the external traffic management system. A signal received from external traffic management system 128 could specify the frame rate. Alternatively, processor 118 could determine an appropriate frame rate based on the type of triggering event detected.

At step 606, a request is sent to the frame grabber circuit 134 of camera 132 for a video image with an appropriate frame rate. At step 608, the camera 132 receives images of the road and at step 610 produces electrical signals that are transmitted to the frame grabber circuit 134. At step 612, the frame grabber circuit 134 digitizes the signals produced by camera 132 and transmits these digitized signals to the image compression unit 136. At step 614, the image compression unit 136 compresses the digitized signals and transmits them to serial interface 137. Processor 118 controls frame grabber circuit 134 and compressor unit 136 to provide frame rate and compression ratios based on the available bandwidth of communication link 138. Of course, in some embodiments where multiple communication links are provided, less compression, and a higher frame rate may be possible. At step 616, serial interface 137 uses the appropriate protocol to transmit the signal to external traffic management system 128 over network 130. As mentioned above the protocol used could be TCP/IP, which would allow for transmission over the Internet or an Ethernet-based private network.

Figure 7:
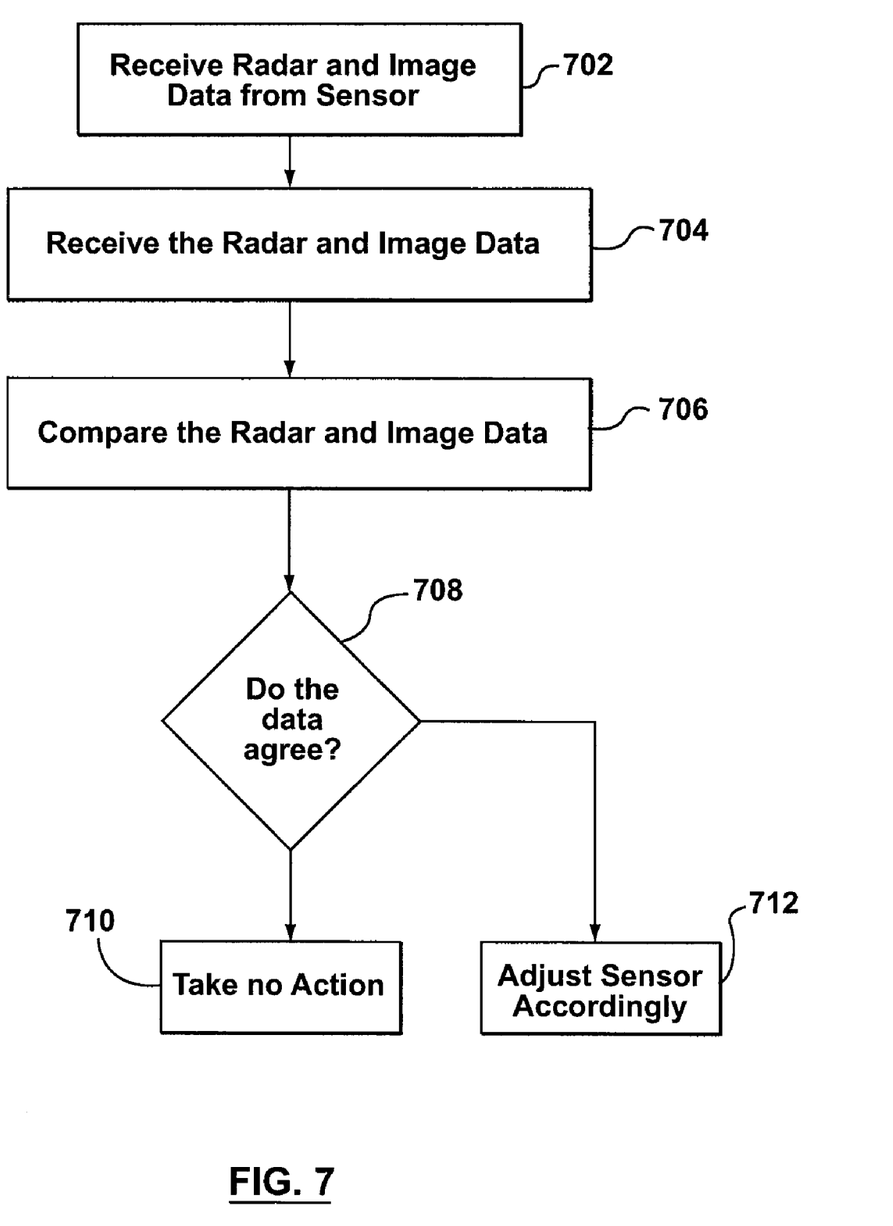
FIG. 7, in a flowchart, illustrates a method of verifying the calibration of the traffic sensor in accordance with an aspect of an embodiment of the invention.

Referring to FIG. 7, there is illustrated a method for verifying and correcting the calibration of a sensor 100 in accordance with an aspect of a further embodiment of the invention. The video data is requested and transmitted in the manner described above with respect to FIG. 6. A method of processing and transmitting radar traffic data by a sensor 100 is disclosed in pending U.S. application Ser. No. 11/197,456 filed by the applicant on Aug. 5, 2005, the contents of which are hereby incorporated by reference. At step 702, the external traffic management system 128 receives traffic and image data from sensor 100 through network 130. In the embodiment illustrated the image and traffic data are incorporated in one signal. Thus, at step 704, the traffic data and image data are separated using appropriate software and hardware, such as a demultiplexer, at the external traffic management center 128. However, it should be understood that the traffic and image data may not be transmitted across a single channel, in which case step 704 is not required. Then at step 706, the image data and traffic data are compared. At step 708, it is determined whether the traffic data and the image data agree. If the data agree then no action is taken and at step 710 the process ends. In contrast, if the data do not agree than at step 712 the sensor is adjusted such that each of the detection zones are centered on a valid lane of traffic. This may be done, for example, by using the calibration methods disclosed in U.S. Pat. Nos. 6,556,916 and 5,798,983 and in U.S. patent application Ser. No. 11/182,817 filed by the applicant on Jul. 18, 2005, the contents of which are hereby incorporated by reference.

It should be understood that various modifications and adaptations could be made to the embodiments described and illustrated herein. Accordingly, the scope of the present invention is defined in the appended claims.

The invention claimed is:

1. A method of operating a traffic sensor to collect vehicular traffic data for a road, the traffic sensor having a radar module and an image module both contained in a traffic sensor enclosure, the method comprising:
   a) operating the radar module to generate radar-based vehicle data regarding a plurality of vehicles passing a sensor field of view based on detection and measurement of the traffic on the road;
   b) operating the image module to generate image data representing a plurality of images of the road and the traffic on the road;
   c) determining if a triggering event has occurred;
   d) transmitting the radar-based vehicle data to a remote location spaced from the traffic sensor and, if the triggering event is determined to have occurred, transmitting the image data to the remote location; and
   e) if the triggering event is determined to have occurred, comparing the radar-based vehicle data with the image data at the remote location;
   wherein the image module is a video camera and the image data is not transmitted to the remote location and is not compared with the radar-based vehicle data unless the triggering event is determined to have occurred.

2. The method as defined in claim 1 wherein step e) comprises providing both the radar-based vehicle data and the image data to a human operator for verification of the radar-based vehicle data using the image data.

3. The method as defined in claim 1 further comprising compressing the image data before transmitting the compressed image data to the remote location.

4. The method as defined in claim 3 further comprising, before step e), if the triggering event is determined to have occurred, combining the radar-based vehicle data and the compressed image data, transmitting the combined radar-based vehicle data and compressed image data to the remote location via a single channel, and then separating and separately displaying the radar-based vehicle data and the image data.

5. The method as defined in claim 1 further comprising reviewing the radar-based vehicle data at the remote location to determine if the triggering event has occurred, and, if the triggering event is determined to have occurred, sending an instruction signal to the traffic sensor to instruct the traffic sensor to transmit the image data to the remote location.

6. The method as defined in claim 1 further comprising controlling the frame rate of transmission of the image data to the remote location.

7. The method as defined in claim 1 wherein the triggering event is an instruction signal sent to the traffic sensor to instruct the traffic sensor to transmit the image data to the remote location.

8. The method as defined in claim 1 further comprising processing the radar-based vehicle data at the traffic sensor to determine if the triggering event has occurred, and, if the triggering event is determined to have occurred, transmitting the image data to the remote location.

9. The method as defined in claim 8 further comprising storing a plurality of trigger criteria, wherein the step of processing the radar-based vehicle data at the traffic sensor to determine if the triggering event has occurred comprises determining if an event has occurred satisfying any of the plurality of trigger criteria.

10. The method as defined in claim 3, wherein the step of compressing the image data comprises compressing the image data in one of MPEG-2 and MPEG-4 format.

11. The method as defined in claim 1, wherein the step of transmitting the radar-based vehicle data comprises transmitting the radar-based vehicle data and the image data to a remote location via TCP/IP protocol.

12. A traffic sensor for collecting vehicular traffic data for a road, the traffic sensor comprising:
   a radar module for generating radar-based vehicle data regarding a plurality of vehicles passing the sensor field of view based on detection and measurement of traffic;
   an image module for generating image data representing a plurality of images of the road and the traffic;
   a communication link for transmitting both the radar-based vehicle data and the image data to a remote location spaced from the traffic sensor;
   a processor for determining if a triggering event has occurred, wherein the processor is operable to control transmission of the image data to the remote location such that the image data is not transmitted to the remote location unless the triggering event is determined to have occurred; and
   a traffic sensor enclosure for enclosing both the radar module and the image module.

13. The traffic sensor as defined in claim 12 wherein the image module comprises a video camera for generating the plurality of images.

14. The traffic sensor as defined in claim 13 wherein the traffic sensor enclosure comprises a window for providing the video camera with a sight field of view overlapping the sensor field of view.

15. The traffic sensor as defined in claim 12 further comprising an internal compression circuit for compressing the image data before transmitting the compressed image data to the remote location.

16. The traffic sensor as defined in claim 12 wherein the communication link comprises a single channel, and the traffic sensor further comprises a multiplexer for combining the radar-based vehicle data and the compressed image data for transmission to the remote location via the single channel.

17. The traffic sensor as defined in claim 12 wherein the triggering event is an instruction signal sent to the traffic sensor to instruct the traffic sensor to transmit the image data to the remote location.

18. The traffic sensor as defined in claim 12 wherein the processor is operable to process the radar-based vehicle data at the traffic sensor to determine if the triggering event has occurred.

19. The traffic sensor as defined in claim 18 further comprising a storage module for storing a plurality of trigger criteria, wherein the processor is operable to process the radar-based vehicle data at the traffic sensor to determine if the triggering event has occurred by determining if an event has occurred satisfying any of the plurality of trigger criteria stored in the storage module.

20. The traffic sensor as defined in claim 12 wherein the processor is further operable to control the frame rate of transmission of the image data to the remote location.

21. A method of operating a traffic sensor to collect vehicular traffic data for a road, the traffic sensor having a radar module and an image module both contained in a traffic sensor enclosure, the method comprising:
   a) operating the radar module to generate radar-based vehicle data regarding a plurality of vehicles passing a sensor field of view based on detection and measurement of the traffic on the road;
   b) operating the image module to generate image data representing a plurality of images of the road and the traffic on the road; and
   c) comparing the radar-based vehicle data with the image data;
   wherein step c) comprises providing both the radar-based vehicle data and the image data to a human operator for verification of the calibration of the traffic sensor using the radar-based vehicle data and the image data.

22. The method as defined in claim 21 wherein the radar-based vehicle data is verified in step c) to determine whether the traffic sensor is calibrated to detect vehicles passing through the sensor field of view.

23. The method as defined in claim 21 wherein the radar-based vehicle data is verified in step c) to determine whether the traffic sensor is calibrated such that the sensor field of view is centered on a lane of traffic.

* * * * *